United States Patent
Baier et al.

(10) Patent No.: US 11,493,608 B2
(45) Date of Patent: Nov. 8, 2022

(54) LIDAR DEVICE AND METHOD FOR SCANNING A SCANNING ANGLE USING AT LEAST ONE BEAM OF CONSTANT ALIGNMENT

(71) Applicant: Robert Bosch GmbH, Stuttgart (DE)

(72) Inventors: Matthias Baier, Lehrensteinsfeld (DE); Annemarie Holleczek, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 498 days.

(21) Appl. No.: 16/613,459

(22) PCT Filed: May 9, 2018

(86) PCT No.: PCT/EP2018/061982
§ 371 (c)(1),
(2) Date: Nov. 14, 2019

(87) PCT Pub. No.: WO2018/215212
PCT Pub. Date: Nov. 29, 2018

(65) Prior Publication Data
US 2021/0156970 A1    May 27, 2021

(30) Foreign Application Priority Data
May 24, 2017  (DE) .......................... 102017208860.5

(51) Int. Cl.
*G01S 7/481* (2006.01)
*G01S 17/42* (2006.01)
(Continued)

(52) U.S. Cl.
CPC ............ *G01S 7/4817* (2013.01); *G01S 17/42* (2013.01); *G02B 26/105* (2013.01); *G01S 17/89* (2013.01)

(58) Field of Classification Search
CPC ..... G01S 7/4817; G01S 17/42; G02B 27/642; G02B 3/0068; G02B 26/105
See application file for complete search history.

(56) References Cited

U.S. PATENT DOCUMENTS

2003/0234923 A1    12/2003  Hipp
2009/0123158 A1*   5/2009   Ray ........................ G01S 7/4972
                                                           398/140
(Continued)

FOREIGN PATENT DOCUMENTS

EP    2492738 A1    8/2012
JP    S57135914 A   8/1982
(Continued)

OTHER PUBLICATIONS

International Search Report dated Jul. 20, 2018 of the corresponding International Application PCT/EP2018/061982 filed May 9, 2018.

*Primary Examiner* — Mirza F Alam
(74) *Attorney, Agent, or Firm* — Norton Rose Fulbright US LLP; Gerard Messina

(57) ABSTRACT

A LIDAR device for scanning a scanning angle using at least one beam includes at least one beam source generating the at least one beam, a rotatable deflection unit deflecting the at least one beam, and a detector receiving the at least one beam after reflection on an object, where at least two cylindrical lenses are situated in a beam path of the at least one beam between the beam source and the deflection unit, at least one cylindrical lens is rotatable.

17 Claims, 4 Drawing Sheets

(51) Int. Cl.
*G02B 26/10* (2006.01)
*G01S 17/89* (2020.01)

(56) References Cited

U.S. PATENT DOCUMENTS

| | | | | |
|---|---|---|---|---|
| 2012/0212727 | A1* | 8/2012 | Hammes | G01V 8/18 250/236 |
| 2014/0078514 | A1* | 3/2014 | Zhu | G01S 17/10 356/606 |
| 2018/0364333 | A1* | 12/2018 | Jungwirth | G01S 7/4814 |
| 2019/0302239 | A1* | 10/2019 | Baier | G02B 26/10 |

FOREIGN PATENT DOCUMENTS

| | | |
|---|---|---|
| JP | H08320216 A | 12/1996 |
| JP | H10325872 A | 12/1998 |
| JP | 2007187581 A | 7/2007 |
| JP | 2008005344 A | 1/2008 |

\* cited by examiner

LIDAR DEVICE AND METHOD FOR SCANNING A SCANNING ANGLE USING AT LEAST ONE BEAM OF CONSTANT ALIGNMENT

CROSS-REFERENCE TO RELATED APPLICATIONS

The present application is the national stage of International Pat. App. No. PCT/EP2018/061982 filed May 9, 2018, and claims priority under 35 U.S.C. § 119 to DE 10 2017 208 860.5, filed in the Federal Republic of Germany on May 24, 2017, the content of each of which are incorporated herein by reference in their entireties.

FIELD OF THE INVENTION

The present invention relates to a LIDAR device for scanning a scanning angle using at least one beam and a method for operating a LIDAR device.

BACKGROUND

Present LIDAR (light detection and ranging) devices use a laser or beam source to generate a laser beam, which can subsequently be deflected via a deflection unit, for example, a rotatable mirror, and via a scanning area. The beam is typically generated by the beam source in such a way that the beam extends through a rotation axis of the deflection unit and is deflected by an angle of approximately 45° perpendicularly in relation to the rotation axis. A scanning area having a horizontal angle of 360° around the LIDAR device can be scanned by the rotation. A detector can receive and analyze reflected beams. Both the laser source and the detector can be situated fixed in place. In such a LIDAR device, the beam reflected by the deflection unit changes its orientation due to the rotation of the deflection unit by a horizontal angle of, for example, 360°. For example, if a linear beam is generated, a line illumination thus is not implemented without a rotation of the line orientation over large spatial angles. In the case of greater horizontal angles, an originally vertically aligned linear beam is rotated by the deflection unit during its rotation in such a way that it can be emitted horizontally or diagonally aligned into the scanning area.

SUMMARY

An object underlying the present invention can be considered that of providing a method and a LIDAR device for scanning a scanning area using at least one beam, which has a constant orientation over the entire scanning area.

According to one aspect of the present invention, a LIDAR device for scanning a scanning angle using at least one beam is provided. The LIDAR device includes at least one beam source for generating the at least one beam, an optional generating optics for forming the at least one generated beam, and a rotatable deflection unit for deflecting the at least one generated beam. Furthermore, the LIDAR device includes a detector for receiving at least one beam reflected on an object, at least two cylindrical lenses being situated in a beam path of the at least one beam between the optional generating optics or the beam source and the deflection unit, and at least one cylindrical lens being rotatable.

In this case, at least one electromagnetic beam can be generated by at least one beam source. The beam source can be, for example, a laser. The at least one beam can be formed by the optional generating optics. For example, a beam, which is designed as punctiform or circular, can be focused to form a line. The optional generating optics can thus be, for example, a cylindrical lens, a Fresnel lens, a diffractive optical element, a tandem cylindrical lens, etc. Alternatively or additionally, the at least one generated beam can be formed into a dot matrix. In this case, the optional generating optics can include additional beam splitters or a plurality of beams can be generated by multiple beam sources. The individual dots are each formed by one generated beam in the dot matrix. The dot matrix can be formed, for example, as a line, a circle, a rectangle, etc. Due to the incorporation of a suitable beam deflection before the rotatable deflection unit, a line or a dot matrix can be emitted over all spatial directions while maintaining the line orientation in the surroundings or a scanning area. A rotation of an orientation of the generated beam deflected by the deflection unit can thus be counteracted. This can be applied similarly in the case of a generated dot matrix. In this case, the generated dots of a dot matrix are exchanged twice in their sequence during a revolution of the deflection unit by 360°, for example. Tilting or rotating of the at least one generated beam causes a continuous change of the area of the at least one generated and formed beam and thus also a change of the scanning area or a vertical scanning angle of the LIDAR device. The at least two combined cylindrical lenses are situated pivoted at an angle in relation to one another. The cylindrical lenses have a distance in relation to one another which is less than a focal length of the cylindrical lenses. The cylindrical lenses advantageously have the same optical properties, for example, focal length, geometrical dimensions, and refractive index. Alternatively, the cylindrical lenses can differ from one another in their optical properties. At least one cylindrical lens is situated so it is rotatable around its optical axis in this case. In this case, multiple cylindrical lenses can also be jointly situated so they are rotatable as a composite. In a composite, the cylindrical lenses can have a defined constant angle offset or a variable angle offset in relation to one another. The optical axis of the cylindrical lenses is preferably the optical axis of the at least one generated beam at the same time. The at least one cylindrical lens or the composite of at least two cylindrical lenses can be rotatable in this case synchronously with the rotation of the deflection unit. Alternatively or additionally, the rotational velocity can be decreased or increased depending on an area of use of the LIDAR device. In this way, for example, the vertical scanning angle can be varied and, for example, a vertical scanning width of the scanning area can be reduced or enlarged. Since the at least one beam is incident in the same alignment on the deflection unit during the entire rotation, the orientation and the distribution of the at least one beam does not change or changes in a defined way at all emission angles of the deflection device. Due to the use of at least two cylindrical lenses, which are situated pivoted in relation to one another, the at least one beam, which is generated and already formed, is rotated in at least two steps. Preferably many pieces of optical information of the generated and formed beam are transmitted via the cylindrical lenses in this way and losses are minimized.

According to an example embodiment of the LIDAR device, the deflection unit has a distance in relation to the cylindrical lens adjacent to the deflection unit which corresponds to a focal length of the adjacent cylindrical lens. In this way, the beam bundled by the cylindrical lens adjacent to the deflection unit is focused on the deflection unit. The deflection unit is thus located in a focal point of the adjacent cylindrical lens and enables an optimum imaging of the beam by the deflection unit in the scanning area.

According to an example embodiment of the LIDAR device, the at least two cylindrical lenses are situated pivoted in relation to one another by an angle of 45°. The originally circular beam generated by the beam source is formed by an optional generating optics or a first cylindrical lens into a line. The linear beam can be rotated on the deflection unit by the two further cylindrical lenses, which are situated pivoted by 45° in relation to one another. The deflection unit can be, for example, a rotatable mirror.

According to an example embodiment of the device, the deflection unit has a distance in relation to the cylindrical lens adjacent to the deflection unit which is greater than the focal length of the adjacent cylindrical lens. In this way, the deflection unit can have a distance in relation to the cylindrical lenses which is greater than the focal length of the cylindrical lens situated closest to the deflection unit. In this way, the LIDAR device can be designed flexibly and is not limited by the optical properties of the cylindrical lenses. For this purpose, the at least two cylindrical lenses are preferably situated pivoted by an angle of 90° in relation to one another. Since the deflection unit is situated farther away from the cylindrical lens adjacent to the deflection unit than its focal length, the cylindrical lenses have to be situated pivoted by an angle of 90° in relation to one another, so that the rotation of the beam can be imaged on the deflection unit.

According to an example embodiment of the LIDAR device, the at least one cylindrical lens is rotatable synchronously with the deflection unit. The at least two cylindrical lenses can be mechanically or electronically connected to the deflection unit for this purpose, for example. The cylindrical lenses can thus rotate as a composite with the same angular velocity as the deflection unit. In particular, the deflection unit can be used as a mechanical drive for the composite of at least two cylindrical lenses or for one single cylindrical lens. Alternatively, the at least two cylindrical lenses as a composite or one of the cylindrical lenses individually can be equipped with a separate drive suitable for a rotation, so that the cylindrical lenses can be rotated or can be synchronized in accordance with an electronic signal of the deflection unit.

According to an example embodiment, at least one cylindrical lens is situated in a stationary manner. At least one cylindrical lens is thus situated in a stationary manner jointly with the beam source and the detector and is not also rotated. At least one cylindrical lens is thus furthermore designed as rotatable to be able to correct the orientation of the beam. In this way, only one cylindrical lens also has to be rotated, so that a rotation mass can be reduced.

According to an example embodiment, the at least one generated beam has a line shape. The generated beam can be formed arbitrarily by the optional generating optics depending on a field of use and the requirements resulting therefrom. For example, the beam can be designed as linear. The beam preferably has a two-dimensional line shape, using which the scanning area can be scanned. In this case, the optional generating optics is advantageously a cylindrical lens or a combination of a cylindrical lens with further optical elements. The optional generating optics can thus also have a technically simple design in the form of a single cylindrical lens.

According to an example embodiment of the LIDAR device, the at least one generated beam has a dot shape. In this way, the optional generating optics can include beam splitters, diffractive optical elements, or the like which can split the at least one beam generated by the beam source or fan it out into multiple beams. The individual beams preferably form individual beam dots in this case, which can be used to expose the scanning area. The scanning area can be exposed in a pulsed or continuous manner by a dot matrix. In this way, the LIDAR device can also be constructed coaxially and can emit generated beams and receive reflected beams simultaneously. For this purpose, the generated beams and the reflected beams can have at least a slight offset in relation to one another and can preferably be incident on different areas on the deflection unit. Since the at least one cylindrical lens is designed to be rotatable, the generated dot matrix having the individual beams maintains its orientation independently of an alignment of the deflection unit. A sequence of the individual beams remains constant in this way.

According to an example embodiment of the LIDAR device, the deflection unit includes a planar or curved mirror. The deflection unit can be designed in the form of a rotatable or pivotable planar mirror in a technically simple design. Alternatively, the mirror can include a curved or contoured surface, which can be designed to correct imaging errors of the cylindrical lenses.

According to a further aspect of the present invention, a method is provided for operating a LIDAR device for scanning a scanning angle using at least one beam. At least one beam is generated and formed by an optional generating optics. The at least one beam is subsequently rotated around an optical axis by at least one rotatable cylindrical lens and imaged on a deflection unit. The at least one beam can be deflected along a scanning angle by the deflection unit. If an object is located in the scanning area, at least one beam reflected on this object is received by a detector via an optional receiving optics and converted into electric signals. The electric signals can subsequently be processed and analyzed.

The generated and formed beam or multiple beams can be rotated directly or indirectly depending on the deflection unit by the at least one rotatable cylindrical lens. An orientation of the at least one beam can thus be corrected, influenced, or aligned constantly during an exposure of the scanning area. The at least one generated beam formed by the optional generating optics is preferably rotated by at least two cylindrical lenses. In this way, the at least one beam is rotated in multiple steps around its optical axis and adjusted in accordance with an alignment of the deflection unit.

Preferred example embodiments of the present invention are explained in greater detail hereafter on the basis of greatly simplified schematic views of the figured throughout which the same design elements have the same reference numerals. For the sake of clarity, only the design elements essential for comprehending the present invention are identified in the figures.

DETAILED DESCRIPTION

Figure 1:
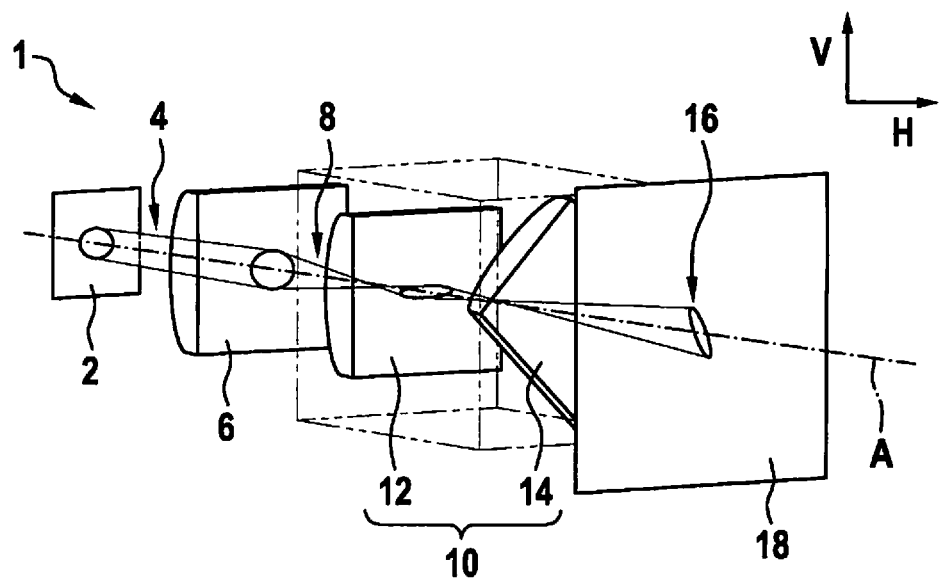
FIG. 1 shows a schematic view of a LIDAR device according to a first example embodiment of the present invention.

FIG. 1 shows a schematic view of a LIDAR device 1 according to a first example embodiment. LIDAR device 1 includes in this case a beam source 2 for generating at least one electromagnetic beam 4. According to the example embodiment, beam source 2 is a laser 2 that generates a laser beam 4. Generated beam 4 is radiated onto a generating optics 6. Generating optics 6 is a cylindrical lens 6 that focuses generated beam 4 in a vertical direction V and fans it out behind a focal point of cylindrical lens 6 to form a linear beam 8. The linear beam is subsequently incident on a cylindrical lens composite 10 made of two cylindrical lenses 12, 14. Cylindrical lens composite 10 is designed rotatably as a whole. Optical axis A of LIDAR device 1 is used as the rotation axis in this case. The two cylindrical lenses 12, 14 are situated pivoted by a constant angle of 45° in relation to each other according to the example embodiment. Beam 8 is rotated by rotatable cylindrical lens composite 10 in two steps around optical axis A. Rotated beam 16 can subsequently be imaged on a rotatable deflection unit 18. Deflection unit 18 reflects rotated beam 16 along a scanning area. Deflection unit 18 can be, for example, a rotatable mirror 18. Deflection unit 18 has, according to the example embodiment, a distance in relation to its adjacent cylindrical lens 14 that corresponds to a focal length of cylindrical lens 14. Cylindrical lens composite 10 rotates in this case synchronously with deflection unit 18 and aligns beam 8 in such a way that rotated beam 16 is incident having a constant orientation on deflection unit 18 and is thus reflected having a constant orientation into the scanning area.

Figure 2:
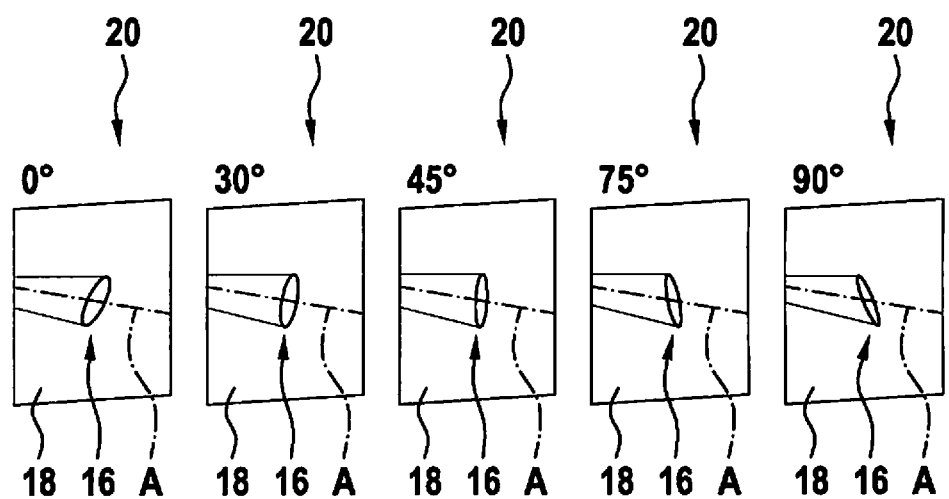
FIG. 2 shows images of a beam on a deflection unit at different rotation angle positions of a cylindrical lens composite of a LIDAR device according to the first example embodiment.

FIG. 2 shows images 20 of rotated beam 16 on deflection unit 18 at different rotation angles of entire cylindrical lens composite 10 of LIDAR device 1 according to the first example embodiment. The rotation angles of cylindrical lens composite 10 are shown in this case in relation to an alignment of cylindrical lens composite 10 according to FIG. 1 which shows a rotation angle of 90°.

Figure 3:
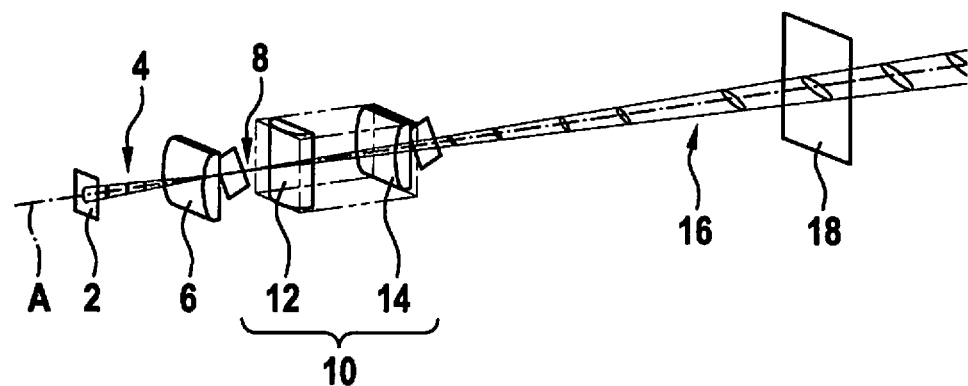
FIG. 3 shows a schematic view of a LIDAR device according to a second example embodiment of the present invention.

FIG. 3 shows a schematic view of a LIDAR device 1 according to a second example embodiment. In contrast to the first example embodiment, LIDAR device 1 includes a deflection unit 18 that is situated at a distance in relation to adjacent cylindrical lens 14. In this case, the distance is greater than the focal length of cylindrical lens 14. In order for rotated beam 16 to be imaged optimally on deflection unit 18, cylindrical lenses 12, 14 of cylindrical lens composite 10 are pivoted at an angle of 90° in relation to each other.

Figure 4:
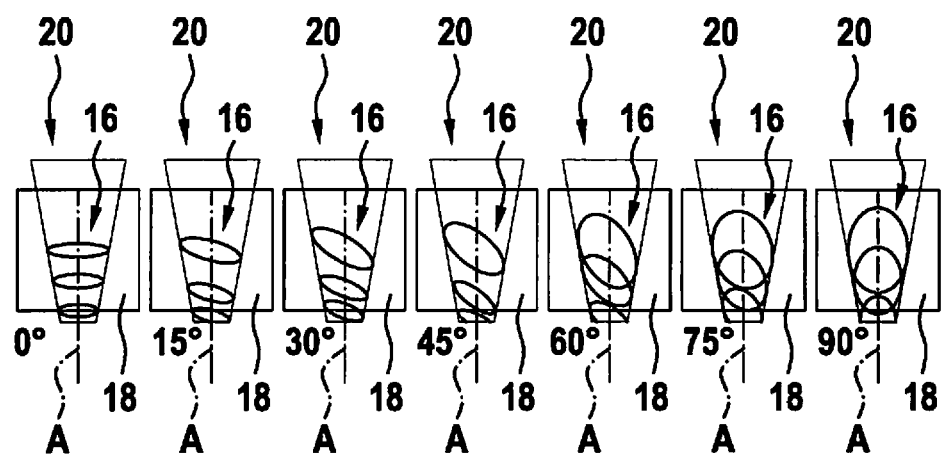
FIG. 4 shows images of a beam on a deflection unit at different rotation angle positions of a cylindrical lens composite of a LIDAR device according to the second example embodiment.

FIG. 4 shows for this purpose images 20 of rotated beam 16 on deflection unit 18 at different rotation angle positions of cylindrical lens composite 10 of LIDAR device 1 according to the second example embodiment. Cylindrical lens composite 10 has a rotation angle of 0° according to FIG. 3. Images 20 illustrate shapes of beam 16 rotated for the purpose of correction at different rotation angle positions of cylindrical lens composite 10 upon an incidence on deflection unit 18.

Figure 5:
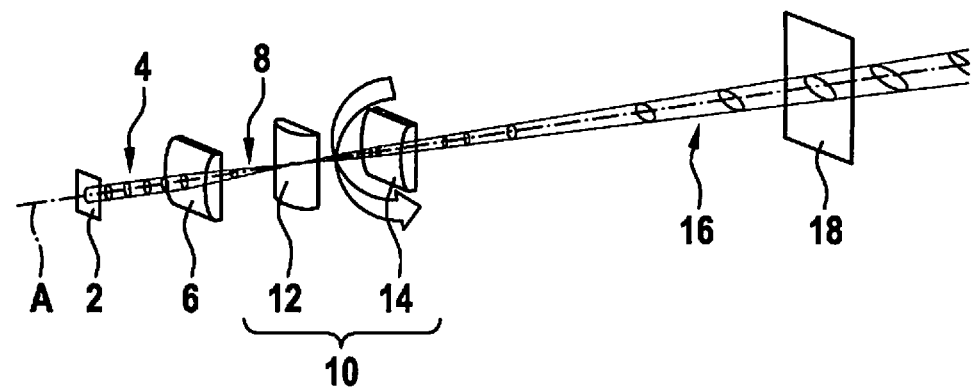
FIG. 5 shows a schematic view of a LIDAR device according to a third example embodiment of the present invention.

FIG. 5 shows a schematic view of a LIDAR device 1 according to a third example embodiment. In contrast to the above-described example embodiments, LIDAR device 1 does not have a cylindrical lens composite that is rotated as a whole. In this case, one cylindrical lens 12 is designed as stationary or non-rotatable with generating optics 6. Cylindrical lens 14 situated adjacent to deflection unit 18 is rotatably mounted around optical axis A according to the example embodiment. Cylindrical lens 14 is designed as rotatable synchronously with deflection unit 18 in this case and adjusts formed beam 8 in relation to an alignment of rotatable deflection unit 18. Deflection unit 18 is situated outside the focal length of adjacent cylindrical lens 14, similarly to the second example embodiment.

Figure 6:
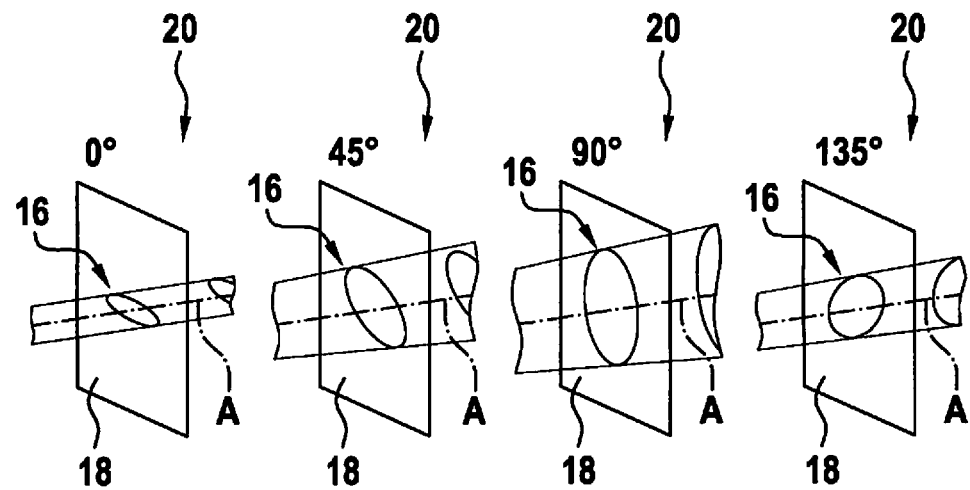
FIG. 6 shows images of a beam on a deflection unit at different rotation angle positions of a cylindrical lens composite of a LIDAR device according to the first example embodiment.

FIG. 6 shows images 20 of rotated beam 16 on deflection unit 18 at different rotation angle positions of cylindrical lens 14 of LIDAR device 1 according to the third example embodiment. Cylindrical lens 14 has a rotation angle of 0° in this case in FIG. 5. It is clear in particular here that during the rotation of a single cylindrical lens 14, the line shape of rotated beam 16 merges into an oval shape and thus an imaging quality of beam 16 is reduced in comparison to a rotatable cylindrical lens composite 10.

Figure 7:
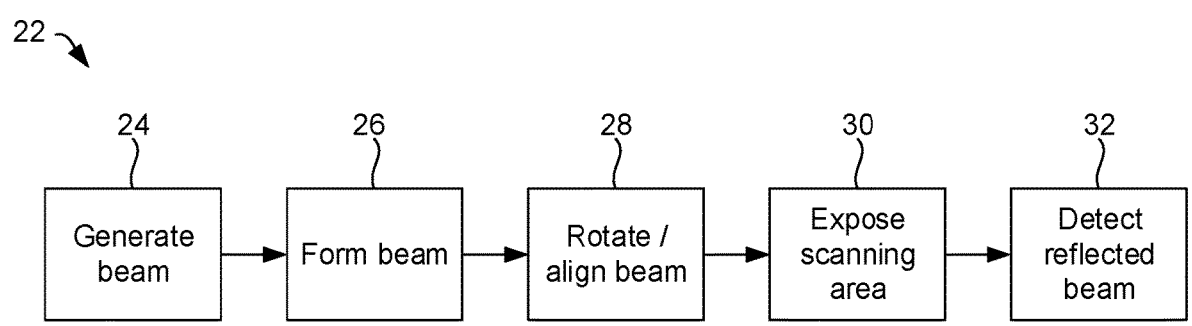
FIG. 7 shows a method for scanning a scanning area according to an example embodiment of the present invention.

FIG. 7 illustrates a method 22 for scanning a scanning area according to an example embodiment. At least one beam 4 is generated 24 and formed 26 by a generating optics 6. Formed beam 8 is subsequently rotated or aligned 28 by at least one rotatable cylindrical lens 12, 14 and projected on a deflection unit 18. Deflection unit 18 reflects beam 16 and exposes 30 a scanning area using beam 16. Beam 16 is rotated in such a way that an orientation of beam 16 remains constant across a rotation area of the deflection unit. A beam reflected on an object can be received and detected 32 by a detector and an optional receiving optics.

What is claimed is:

1. A LIDAR device for scanning a scanning angle, the LIDAR device comprising:
   a beam source;
   a rotatable deflector;
   a first cylindrical lens;
   a second cylindrical lens; and
   a detector;
   wherein:
      the beam source is configured to generate a beam;
      the rotatable deflector is configured to deflect the beam;
      the first and second cylindrical lenses are arranged in a beam path of the beam between the beam source and the rotatable deflector;
      at least one of the first and second cylindrical lenses is rotatable; and
      the detector is configured to receive the beam after being reflected by an object;
      the first and second cylindrical lenses are arranged to rotate the beam, in two stages, about an optical axis of the beam prior to impinging upon the rotatable deflector, the arrangement being such that:
         the first cylindrical lens is configured to rotate about the optical axis and the second cylindrical lens is rotationally stationary about the optical axis; or
         the first and second cylindrical lenses are both configured to rotate about the optical axis, and respective rotational positions of central longitudinal axes of the curvatures of the first and second cylindrical lenses about the optical axis are offset from each other with a constant angular offset; and the two stages include a first partial rotation of the beam about the optical axis implemented by the first cylindrical lens and a second partial rotation of the beam about the optical axis implemented by the second cylindrical lens.

2. The LIDAR device of claim 1, wherein a distance between the deflector and one of the at least two cylindrical lenses that is closest, of the at least two cylindrical lenses, to the deflector equals a focal length of the closest of the at least two cylindrical lenses.

3. The LIDAR device of claim 1, wherein a distance between the deflector and one of the at least two cylindrical lenses that is closest, of the at least two cylindrical lenses, to the deflector is greater than a focal length of the closest of the at least two cylindrical lenses.

4. The LIDAR device of claim 1, wherein the beam has a line shape.

5. The LIDAR device of claim 1, wherein the beam has a dot shape.

6. The LIDAR device of claim 1, wherein the deflector includes a planar mirror.

7. The LIDAR device of claim 1, wherein the deflector includes a curved mirror.

8. The LIDAR device of claim 1, wherein the first cylindrical lens is configured to rotate about the optical axis and the second cylindrical lens is rotationally stationary about the optical axis.

9. The LIDAR device of claim 8, wherein LIDAR device is configured so that the rotation of the first cylindrical lens is performed synchronously with rotations of the deflector.

10. The LIDAR device of claim 1, further comprising a third cylindrical lens that is arranged between the beam source and the the and second cylindrical lenses and that is configured to perform an initial focusing of the beam prior to the beam reaching the first and second cylindrical lenses.

11. The LIDAR device of claim 1, wherein the first and second cylindrical lenses are both configured to rotate about the optical axis, and the respective rotational positions of the central longitudinal axes if the curvatures of the first and second cylindrical lenses about the optical axis are offset from each other with the constant angular offset.

12. The LIDAR device of claim 11, wherein the constant offset is an angle of 45°.

13. The LIDAR device of claim 12, wherein a distance between the deflector and one of the at least two cylindrical lenses that is closest, of the at least two cylindrical lenses, to the deflector equals a focal length of the closest of the at least two cylindrical lenses.

14. The LIDAR device of claim 11, wherein the constant offset is an angle of 90°.

15. The LIDAR device of claim 14, wherein a distance between the deflector and one of the at least two cylindrical lenses that is closest, of the at least two cylindrical lenses, to the deflector is greater than a focal length of the closest of the at least two cylindrical lenses.

16. The LIDAR device of claim 11, wherein the LIDAR device is configured so that the rotation of the first and second cylindrical lenses is performed synchronously with the deflector.

17. A method for operating a LIDAR device to scan a scanning angle, the method comprising:

a beam source generating a beam;

a generating optics focusing the beam into a focused beam;

a first cylindrical lens and a second cylindrical lens rotating the focused beam, in two stages, around an optical axis of the focused beam prior to impinging upon the rotatable deflector, wherein the first and second cylindrical lenses are arranged in a beam path of the focused beam between the beam source and the rotatable deflector;

a rotatable deflector deflecting the focused beam along a scanning angle; and a detector receiving the focused beam after being reflected by an object;

wherein:

for the rotation of the focused beam, the first and second cylindrical lenses are arranged such that:

the first cylindrical lens is configured to rotate about the optical axis and the second cylindrical lens is rotationally stationary about the optical axis; or the first and second cylindrical lenses are both configured to rotate about the optical axis, and respective rotational positions of central longitudinal axes of the curvatures of the first and second cylindrical lenses about the optical axis are offset from each other with a constant angular offset; and the two stages include a first partial rotation of the focused beam about the optical axis implemented by the first cylindrical lens and a second partial rotation of the focused beam about the optical axis implemented by the second cylindrical lens.

* * * * *